US012062319B2

(12) United States Patent
Jung et al.

(10) Patent No.: US 12,062,319 B2
(45) Date of Patent: Aug. 13, 2024

(54) DISPLAY APPARATUS HAVING LOCK FUNCTION AND DISPLAY DRIVING CIRCUIT THEREOF

(71) Applicant: LX Semicon Co., Ltd., Daejeon (KR)

(72) Inventors: Sung Wan Jung, Daejeon (KR); Seong Bok Cha, Daejeon (KR); Soo Woo Kim, Daejeon (KR); Yong Ik Jung, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/210,101

(22) Filed: Jun. 15, 2023

(65) Prior Publication Data

US 2023/0326392 A1 Oct. 12, 2023

Related U.S. Application Data

(63) Continuation of application No. 17/820,862, filed on Aug. 18, 2022, now Pat. No. 11,783,754.

(30) Foreign Application Priority Data

Oct. 12, 2021 (KR) ........................ 10-2021-0134886

(51) Int. Cl.
*G09G 3/20* (2006.01)

(52) U.S. Cl.
CPC ....... *G09G 3/2096* (2013.01); *G09G 2310/08* (2013.01); *G09G 2330/021* (2013.01); *G09G 2330/04* (2013.01)

(58) Field of Classification Search
None
See application file for complete search history.

(56) References Cited

U.S. PATENT DOCUMENTS 7,936,330 B2 * 5/2011 Park .................... G09G 3/3611 345/99
2010/0149082 A1 6/2010 Hong et al.
2010/0149083 A1 6/2010 Park et al.
2015/0379949 A1 12/2015 Wang et al.
2016/0078829 A1 3/2016 Yu et al.
2016/0189595 A1 6/2016 Choi et al.

FOREIGN PATENT DOCUMENTS

KR 2015-0135615 A 12/2015
KR 2016-0078641 A 7/2016
KR 2020-0078832 A 7/2020

* cited by examiner

*Primary Examiner* — Dorothy Harris
(74) *Attorney, Agent, or Firm* — POLSINELLI PC

(57) ABSTRACT

The present disclosure discloses a display apparatus having a lock function and a display driving circuit thereof. The display driving circuit of the present disclosure is configured to transfer a lock signal in a cascade way, receive a lock signal by pull-up and transfer the lock signal in an open drain form.

15 Claims, 1 Drawing Sheet

DISPLAY APPARATUS HAVING LOCK FUNCTION AND DISPLAY DRIVING CIRCUIT THEREOF

CROSS-REFERENCE TO RELATED APPLICATIONS

This application is a continuation of U.S. patent application Ser. No. 17/820,862, filed on Aug. 18, 2022, which claims the priority of Korean Patent Application No. 10-2021-0134886 filed on Oct. 12, 2021, which are hereby incorporated by reference in their entirety for all purposes as if fully set forth herein.

BACKGROUND

1. Technical Field

The present disclosure relates to a display apparatus, and more particularly, to a display apparatus having a lock function for transferring a lock signal through display driving circuits and feeding the lock signal back to a timing controller and the display driving circuit thereof.

2. Related Art

In general, a display apparatus is configured such that display data is transmitted from a timing controller to a display driving circuit, the display driving circuit outputs a source signal corresponding to the display data, and a display panel displays a screen in response to the source signal.

The display data transmitted from the timing controller to the display driving circuit is composed of a packet. The display data may include data corresponding to information for display and a clock for driving the data.

The display driving circuit may recover the data and the clock from the display data, may perform a data processing process by using the recovered clock, and as a result, may output the source signal.

When an error occurs in the clock, there is a difficulty in recovering and processing the data normally. The display driving circuit is configured to define a state of the clock as a lock state when the state of the clock is normal, define a state of the clock as an unlock state when the state of the clock is abnormal, and generate and output a lock signal for indicating a state of the clock.

The lock state may be periodically checked by the timing controller. To this end, the timing controller may provide the lock signal to the display driving circuit. The display driving circuit may provide the timing controller with a feedback lock signal, that is, a combination of the lock signal and an internal lock signal. The timing controller may check a lock state of the display driving circuit in response to the feedback lock signal.

The number of constructed display driving circuits may be determined depending on a size and resolution of a display panel.

If a plurality of display driving circuits is constructed, a lock signal may be provided to the plurality of display driving circuits by using a pull-up method using one transmission line or a cascade method of transferring a lock signal through the display driving circuits.

In the case of the pull-up method, it is difficult to check a lock state of each of the display driving circuits.

Accordingly, the lock signal may be transferred using the cascade method in order to check the lock state of each of the display driving circuits.

In general, the timing controller and the display driving circuit may be configured to use voltages having different levels. For example, the timing controller may use a power source of 1.8 V for input and output, and the display driving circuit may use a power source of 3.3 V for input and output.

The display driving circuits and the timing controller have a difficulty in sharing a lock signal because they use heterogeneous power sources as described above. That is, a compatibility problem may occur between the display driving circuit and the timing controller.

SUMMARY

Various embodiments are directed to guaranteeing compatibility for sharing a lock signal between display driving circuits and a timing controller using heterogeneous power sources.

In an embodiment, a display driving circuit having a lock function may include a comparison unit configured to receive a transfer lock signal and output a comparison signal obtained by comparing the transfer lock signal and an internal lock signal obtained by determining a state of an internal recovery clock, and an output circuit including an internal output pull-up circuit and configured to generate a feedback lock signal having a level corresponding to a level of the comparison signal through the internal output pull-up circuit and to output the feedback lock signal to a lock signal transmission line to which an external power source is applied.

In an embodiment, a display driving circuit having a lock function may include an input circuit including an internal input pull-up circuit and configured to receive and transfer a forwarding lock signal through a lock signal transmission line to which an external power source is applied through the internal input pull-up circuit, a comparison unit configured to output a comparison signal obtained by comparing the forwarding lock signal transferred through the input circuit and an internal lock signal obtained by determining a state of an internal recovery clock, and an output circuit configured to generate a transfer lock signal having a level corresponding to a level of the comparison signal and output the transfer lock signal. The input circuit may transfer the forwarding lock signal to the comparison unit through the internal input pull-up circuit using an internal power source having a level different from a level of the external power source.

In an embodiment, a display apparatus having a lock function may include a timing controller configured to output a forwarding lock signal through a first lock signal transmission line and receive a feedback lock signal through a second lock signal transmission line, and a plurality of display driving circuits including a first display driving circuit for receiving the forwarding lock signal through the first lock signal transmission line and a second display driving circuit for outputting the feedback lock signal through the second lock signal transmission line, and configured to transfer transfer lock signals in a cascade way, respectively. An external power source may be applied to the first lock signal transmission line and the second lock signal transmission line. The first display driving circuit may receive the forwarding lock signal through an internal input pull-up circuit. The second display driving circuit may output the feedback lock signal through an internal output pull-up circuit.

The present disclosure can buffer a voltage difference between heterogeneous power sources by pull-up when a forwarding lock signal is provided from the timing controller to the display driving circuit or a feedback lock signal is provided from the display driving circuit to the timing controller.

Accordingly, the present disclosure has an effect in that it can secure compatibility for sharing a lock signal between the display driving circuits and the timing controller using heterogeneous power sources.

DETAILED DESCRIPTION

In order to drive a display panel for displaying a screen, a display apparatus may include a timing controller and drivers.

Figure 1:
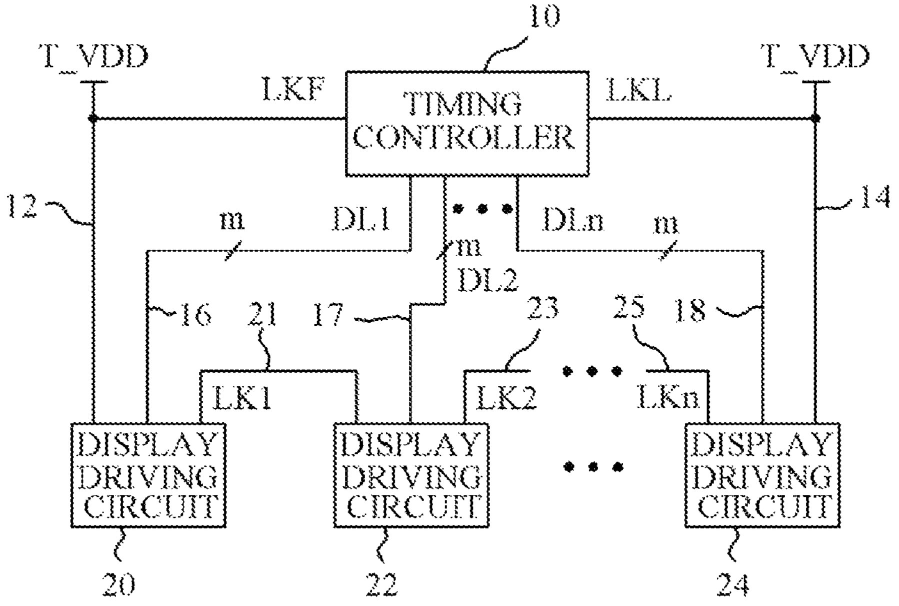
FIG. 1 is a block diagram illustrating a display apparatus according to an embodiment of the present disclosure.

Referring to FIG. 1, a timing controller 10 and display driving circuits 20, 22 and 24 are illustrated.

The timing controller 10 provides the display driving circuits 20, 22 and 24 with display data DL1, DL2 and DLn (wherein n is a natural number greater than 2), respectively. To this end, data transmission lines 16, 17 and 18 are configured between the timing controller 10 and the display driving circuits 20, 22 and 24.

More specifically, the display data DL1 is provided to the display driving circuit through the data transmission line 16. The data display DL2 is provided to the display driving circuit 22 through the data transmission line 17. The display data DLn is provided to the display driving circuit 24 through the data transmission line 18. Each of the data transmission lines 16, 17 and 18 may be configured to include m channels. In this case, m means a natural number greater than 2.

Furthermore, the timing controller 10 is configured to output a forwarding lock signal LKF to the display driving circuit 20 through a lock signal transmission line 12 and to receive a feedback lock signal LKL of the display driving circuit 24 through a lock signal transmission line 14.

The lock signal transmission line 12 is configured between the timing controller and the display driving circuit 20. The lock signal transmission line 14 is configured between the timing controller 10 and the display driving circuit 24. The lock signal transmission lines 12 and 14 may be configured as a single line.

The timing controller 10 may use a power source that provides a voltage of 1.8 V for an operation and input and output, for example. The power source that provides a voltage of 1.8 V may be understood as an external power source on the part of the display driving circuits 20, 22 and 24. Accordingly, the power source that provides the voltage of 1.8 V for an operation and input and output of the timing controller 10 may be defined as an external power source T_VDD.

In FIG. 1, the external power source T_VDD is illustrated as being applied to the lock signal transmission line 12 through which the timing controller 10 outputs the forwarding lock signal LKF and the lock signal transmission line 14 through which the timing controller 10 receives the feedback lock signal LKL. Through the construction, the forwarding lock signal LKF and the feedback lock signal LKL may be transferred using the external power source T_VDD.

The display driving circuits 20, 22 and 24 are configured to transfer lock signals by using the cascade method.

More specifically, the display driving circuit 20 is configured to receive the forwarding lock signal LKF of the timing controller 10 through the lock signal transmission line 12 and to provide a transfer lock signal LK1 to the display driving circuit 22 through a lock signal transmission line 21. Furthermore, the display driving circuit 24 is configured to receive a transfer lock signal LKn of a previous display driving circuit (not illustrated) through a lock signal transmission line 25 and to provide the feedback lock signal LKL to the timing controller 10 through the lock signal transmission line 14. The display driving circuits 20, 22 and said previous display driving circuit are configured to sequentially transfer the transfer lock signals LK1, LK2 and LKn through the lock signal transmission lines 21, 23 and 25, respectively.

The display driving circuits 20, 22 and 24 may use an internal power source that provides a voltage of 3.3 V for an operation and input and output, for example. The internal power source may be defined as SD_VDD.

The transfer lock signals LK1, LK2 and LKn between the display driving circuits 20, 22 and 24 are transferred through the lock signal transmission lines 21, 23 and 25. The internal power source SD_VDD may be understood to be used in the transfer of the transfer lock signals LK1, LK2 and LKn through the lock signal transmission lines 21, 23 and 25.

In the construction, the external power source T_VDD is applied to the lock signal transmission line 12 for the transmission of the forwarding lock signal LKF. That is, for example, a voltage of 1.8 V is applied to the lock signal transmission line 12 for the transmission of the forwarding lock signal LKF. However, the display driving circuit 20 is configured to use the internal power source SD_VDD for an internal operation. That is, for example, a voltage of 3.3 V is used to receive the forwarding lock signal LKF transmitted through the lock signal transmission line 12.

In an embodiment of the present disclosure, the display driving circuit 20 is configured to include an internal input pull-up circuit in order to secure compatibility in an environment in which the timing controller 10 and the display driving circuit 20 use heterogeneous voltages as described above. As a result, the display driving circuit 20 may receive the forwarding lock signal LKF through the internal input pull-up circuit using the internal power source SD_VDD having a level different from a level of the external power source T_VDD.

Furthermore, the external power source T_VDD is applied to the lock signal transmission line 14 for the transmission of the feedback lock signal LKL.

In an embodiment of the present disclosure, the display driving circuit 24 is configured to include an internal output pull-up circuit in order to secure compatibility in an environment in which the timing controller 10 and the display driving circuit 24 use heterogeneous voltages as described above. As a result, the display driving circuit 24 may output the feedback lock signal LKL through the internal output pull-up circuit using the internal power source SD_VDD having a level different from a level of the external power source T_VDD.

The constructions of the display driving circuits 20, 22 and 24 are described with reference to FIG. 2. The display driving circuits 20, 22 and 24 may have the same construction, and thus constructions and operations of the display driving circuits 20, 22 and 24 may be understood based on the description of FIG. 2.

Figure 2:
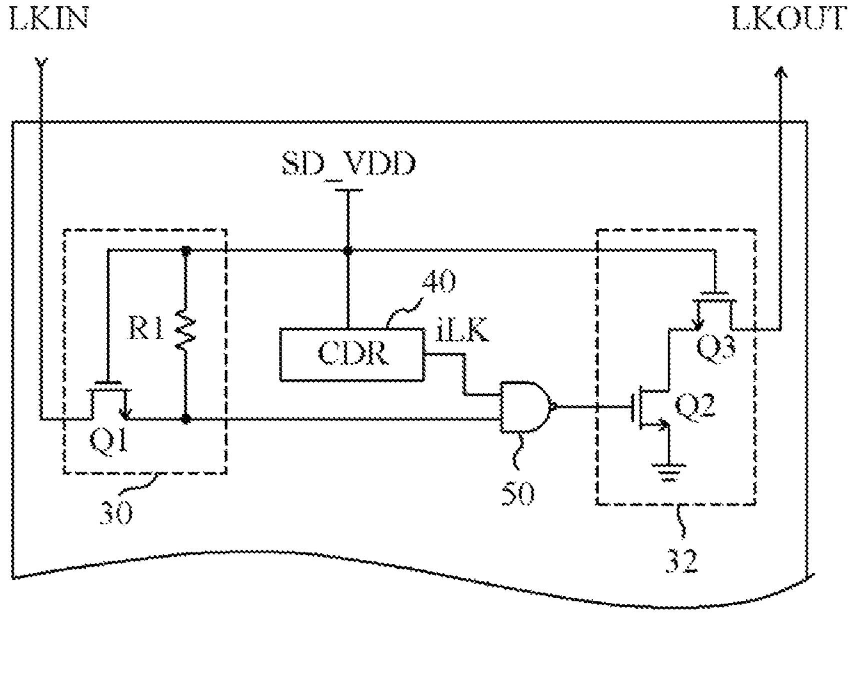
FIG. 2 is a circuit diagram illustrating a display driving circuit according to an embodiment of the present disclosure, which is illustrated in FIG. 1.

First, a case where the embodiment of FIG. 2 is used as the display driving circuit is described. This case corresponds to a construction for receiving the forwarding lock signal LKF through an internal input pull-up circuit using the internal power source SD_VDD having a level different from a level of the external power source T_VDD. The forwarding lock signal LKF may be understood to correspond to LKIN in FIG. 2. The transfer lock signal LK1 may be understood to correspond to LKOUT in FIG. 2.

More specifically, the display driving circuit 20 may include an input circuit 30, a clock data recovery circuit (hereinafter referred to as a "CDR") 40, a comparison unit 50 and an output circuit 32.

The input circuit 30 is for receiving a forwarding lock signal LKIN through the lock signal transmission line 12 to which the external power source VDD is applied. The input circuit 30 may be configured to transfer the forwarding lock signal LKIN to the comparison unit 50 through the internal input pull-up circuit using the internal power source SD_VDD having a level different from a level of the external power source T_VDD. In this case, the internal input pull-up circuit may be understood to include a pull-up device Q1 and a pull-up resistor R1. A detailed construction and operation of the internal input pull-up circuit are described later.

The CDR 40 is configured to recover data and a clock from display data and to provide an internal lock signal iLK obtained by determining whether the clock has been recovered normally.

The comparison unit 50 is configured to output a comparison signal obtained by comparing the forwarding lock signal LKIN transferred through the input circuit 30 and the internal lock signal iLK of the CDR 40 that has determined a state of an internal recovery clock. In this case, the comparison unit 50 may be configured to include a NAND gate that operates the forwarding lock signal LKIN and the internal lock signal iLK. The NAND gate may be configured to output a comparison signal corresponding to a result of the logical NAND operation of the forwarding lock signal LKIN and the internal lock signal iLK.

The output circuit 32 may be configured to generate a transfer lock signal LKOUT having a level corresponding to a level of the comparison signal of the comparison unit 50 and to output the transfer lock signal LKOUT. The transfer lock signal LKOUT of the output circuit 32 may be understood to correspond to the transfer lock signal LK1 in FIG. 1.

In the construction, the input circuit 30, the CDR 40 and the output circuit 32 are illustrated as being operated using the internal power source SD_VDD. The comparison unit 50 may also be understood as being operated using the internal power source SD_VDD.

Furthermore, the input circuit 30 may be understood to include an internal input pull-up circuit as described above. Although not specified in the drawing, the internal input pull-up circuit may be understood to be configured to include the pull-up device Q1 and the pull-up resistor R1.

In this case, the pull-up device Q1 may be composed of an NMOS transistor, and may maintain turn-on by the internal power source SD_VDD applied to a gate thereof. Furthermore, the pull-up device Q1 may be understood to receive the forwarding lock signal LKIN through the lock signal transmission line 12 and to form an open drain for the reception of the forwarding lock signal LKIN.

The pull-up resistor R1 is configured to transfer, to the comparison unit 50, the forwarding lock signal LKIN received through the pull-up device Q1. The pull-up resistor R1 may be configured between the gate and source of the pull-up device Q1 composed of the NMOS transistor.

By the construction of the input circuit 30, the forwarding lock signal LKIN may be transferred to the comparison unit 50 through a node between the source of the pull-up device Q1 and the pull-up resistor R1.

The output circuit 32 may be understood to include an internal output pull-up circuit as described above. Although not specified in the drawing, the internal output pull-up circuit may be understood to be configured to include a switching device Q2 and a protection circuit Q3.

In this case, the switching device Q2 may be composed of an NMOS transistor, and may be configured to be switched based on a level of the comparison signal of the comparison unit 50 applied to a gate thereof. Furthermore, the protection circuit Q3 may be composed of an NMOS transistor, and may be configured to maintain turn-on by the internal power source SD_VDD applied to a gate thereof.

By the construction of the output circuit 32, the transfer lock signal LKOUT may be outputted through the protection circuit Q3 in response to a switching state of the switching device Q2. At this time, the NMOS transistor of the protection circuit Q3 may be understood to form an open drain for the output of the transfer lock signal LKOUT.

When the forwarding lock signal LKIN to which the external power source T_VDD has been applied is inputted to the display driving circuit 20 constructed as in FIG. 2, the forwarding lock signal LKIN is applied to the pull-up resistor R1 of the input circuit 30 having an open drain through the pull-up device Q1. The pull-up resistor R1 may transfer, to the comparison unit 50, the forwarding lock signal LKIN biased by the internal power source SD_VDD.

As described above, a voltage difference between heterogeneous voltages can be buffered by an operation of the input circuit 30. Compatibility for sharing a lock signal between the timing controller 10 and the display driving circuit 20 using heterogeneous voltages can be secured.

If the embodiment of FIG. 2 is used as the display driving circuit 22, it may be understood that internal power sources between adjacent display driving circuits and the display driving circuit 22 do not substantially have a difference. Accordingly, if the display driving circuits 20, 22 and 24 transfer the transfer lock signals LK1, LK2 and LKn by using the cascade method, a transfer lock signal can be easily shared between adjacent display driving circuits.

Furthermore, the display driving circuit 24 can solve a compatibility problem, attributable to an environment in which heterogeneous voltages are used, by outputting the feedback lock signal LKL through the internal output pull-up circuit using the internal power source SD_VDD having a level different from a level of the external power source T_VDD.

If the embodiment of FIG. 2 is used as the display driving circuit 24, the feedback lock signal LKL may be understood to correspond to LKOUT in FIG. 2, and the transfer lock signal LKn may be understood to correspond to LKIN in FIG. 2.

It has been described with reference to FIG. 2 that the output circuit 32 includes the internal output pull-up circuit including the switching device Q2 and the protection circuit Q3.

In the internal output pull-up circuit, the switching device Q2 may be configured to be switched based on a level of the comparison signal of the comparison unit 50 applied to the gate thereof. The protection circuit Q3 may be configured to maintain turn-on by the internal power source SD_VDD applied to the gate thereof.

The protection circuit Q3 constructed using the NMOS transistor forms an open drain in order to output the feedback lock signal LKL.

Accordingly, the feedback lock signal LKOUT of the lock signal transmission line 14 may be driven by the switching of the switching device Q2. Since the external power source T_VDD has been applied to the lock signal transmission line 14, the timing controller 10 may receive the feedback lock signal LKL driven by the external power source T_VDD.

As described above, a voltage difference between heterogeneous voltages can be buffered by an operation of the output circuit 32. Compatibility for sharing a lock signal between the timing controller 10 and the display driving circuit 24 using heterogeneous voltages can be secured.

Accordingly, the present disclosure can buffer a voltage difference between heterogeneous power sources of the timing controller and the display driving circuit by the pull-up of the input circuit or the output circuit, and can secure compatibility for sharing a lock signal in an environment in which heterogeneous power sources are used.

What is claimed is:

1. A display driving circuit having a lock function, comprising:

an input circuit comprising an internal input pull-up circuit and configured to receive a forwarding lock signal through a lock signal transmission line to which an external power source is applied and to transfer the forwarding lock signal through the internal input pull-up circuit;

a comparison unit configured to output a comparison signal obtained by comparing the forwarding lock signal transferred through the input circuit and an internal lock signal obtained by determining a state of an internal recovery clock; and an output circuit configured to generate a transfer lock signal having a level corresponding to a level of the comparison signal and output the transfer lock signal.

2. The display driving circuit of claim 1, wherein the internal input pull-up circuit transfers the forwarding lock signal to the comparison unit by using an internal power source having a level different from a level of the external power source.

3. The display driving circuit of claim 1, wherein:

the comparison unit comprises a NAND gate configured to operate the forwarding lock signal and the internal lock signal, and the NAND gate outputs the comparison signal.

4. The display driving circuit of claim 1, wherein:

the internal input pull-up circuit comprises:

a pull-up device configured to maintain turn-on by an internal power source and receive the forwarding lock signal through the lock signal transmission line; and a pull-up resistor configured to transfer the forwarding lock signal received through the pull-up device, and provides the comparison unit with the forwarding lock signal applied to the pull-up resistor.

5. The display driving circuit of claim 4, wherein:

the pull-up device comprises a first NMOS transistor having a gate to which the internal power source is applied, the pull-up resistor is configured between the gate and source of the first NMOS transistor, and the forwarding lock signal is transferred to the comparison unit through a node between a source of the pull-up device and the pull-up resistor.

6. The display driving circuit of claim 1, wherein:

the output circuit comprises an internal output pull-up circuit, the internal output pull-up circuit comprises:

a switching device configured to receive the comparison signal and switched based on the level of the comparison signal; and a protection circuit configured to maintain turn-on by the internal power source, and the transfer lock signal is outputted through the protection circuit in response to a switching state of the switching device.

7. The display driving circuit of claim 6, wherein:

the protection circuit comprises a second NMOS transistor having a gate to which the internal power source is applied, and the second NMOS transistor forms an open drain for output of the transfer lock signal.

8. A display apparatus having a lock function, comprising:

a timing controller configured to output a forwarding lock signal through a first lock signal transmission line and receive a feedback lock signal through a second lock signal transmission line; and a plurality of display driving circuits comprising a first display driving circuit for receiving the forwarding lock signal through the first lock signal transmission line and a second display driving circuit for outputting the feedback lock signal through the second lock signal transmission line, and configured to transfer transfer lock signals of the first display driving circuit and the second display driving circuit in a cascade way, wherein an external power source is applied to the first lock signal transmission line and the second lock signal transmission line, the first display driving circuit receives the forwarding lock signal through an internal input pull-up circuit, and the second display driving circuit outputs the feedback lock signal through an internal output pull-up circuit.

9. The display apparatus of claim 8, wherein:

the internal input pull-up circuit uses a first internal power source having a level different from a level of the external power source, and the internal output pull-up circuit uses a second internal power source having a level different from a level of the external power source.

10. The display apparatus of claim 8, wherein:

the first display driving circuit comprises:

an input circuit configured to receive the forwarding lock signal through the first lock signal transmission line;

a comparison unit configured to output a comparison signal obtained by comparing the forwarding lock signal transferred through the input circuit and an internal lock signal obtained by determining a state of an internal recovery clock; and an output circuit configured to generate the transfer lock signal having a level corresponding to a level of the comparison signal and output the transfer lock signal, and wherein the input circuit transfers the forwarding lock signal to the comparison unit through the internal input pull-up circuit using a first internal power source.

11. The display apparatus of claim 10, wherein:

the input circuit comprises the internal input pull-up circuit, and the internal input pull-up circuit comprises:

a pull-up device configured to maintain turn-on by the first internal power source and receive the forwarding lock signal through the first lock signal transmission line; and a pull-up resistor configured to transfer the forwarding lock signal received through the pull-up device, and provides the comparison unit with the forwarding lock signal applied to the pull-up resistor.

12. The display apparatus of claim 11, wherein:

the pull-up device comprises a first NMOS transistor having a gate to which the first internal power source is applied, the pull-up resistor is configured between the gate and source of the first NMOS transistor, and the forwarding lock signal is transferred to the comparison unit through a node between a source of the pull-up device and the pull-up resistor.

13. The display apparatus of claim 8, wherein:

the second display driving circuit comprises:

a comparison unit configured to receive the transfer lock signal and output a comparison signal obtained by comparing the transfer lock signal and an internal lock signal obtained by determining a state of an internal recovery clock; and an output circuit configured to generate the feedback lock signal having a level corresponding to a level of the comparison signal and output the feedback lock signal to the second lock signal transmission line, and the output circuit transfers the feedback lock signal to the second lock signal transmission line through the internal output pull-up circuit using a second internal power source.

14. The display apparatus of claim 13, wherein:

the output circuit comprises the internal output pull-up circuit, and the internal output pull-up circuit comprises:

a switching device configured to receive the comparison signal and switched based on the level of the comparison signal; and a protection circuit configured to maintain turn-on for a connection between the second lock signal transmission line and the switching device by the second internal power source.

15. The display apparatus of claim 14, wherein:

the switching device comprises a first NMOS transistor having a gate to which the comparison signal is applied, the protection circuit comprises a second NMOS transistor having a gate to which the second internal power source is applied, and the second NMOS transistor is configured between a drain of the first NMOS transistor and the second lock signal transmission line and forms an open drain for the second lock signal transmission line.

* * * * *